US010719608B2

(12) United States Patent
Carpenter et al.

(10) Patent No.: US 10,719,608 B2
(45) Date of Patent: Jul. 21, 2020

(54) PATCH MONITORING AND ANALYSIS

(71) Applicant: Honeywell International Inc., Morris Plains, NJ (US)

(72) Inventors: Seth G. Carpenter, Phoenix, AZ (US); David J. Brummet, New River, AZ (US); Eric T. Boice, Mesa, AZ (US); Ganesh P. Gadhe, Pune (MH)

(73) Assignee: Honeywell International Inc., Morris Plains, NJ (US)

( * ) Notice: Subject to any disclaimer, the term of this patent is extended or adjusted under 35 U.S.C. 154(b) by 91 days.

(21) Appl. No.: 14/871,921

(22) Filed: Sep. 30, 2015

(65) Prior Publication Data

US 2016/0232359 A1 Aug. 11, 2016

Related U.S. Application Data

(60) Provisional application No. 62/113,165, filed on Feb. 6, 2015.

(51) Int. Cl.
*G06F 21/57* (2013.01)
*G06F 8/71* (2018.01)
*G06F 8/65* (2018.01)

(52) U.S. Cl.
CPC .............. *G06F 21/577* (2013.01); *G06F 8/65* (2013.01); *G06F 8/71* (2013.01)

(58) Field of Classification Search
CPC .......... G06F 21/577; G06F 21/57; G06F 8/60; G06F 8/65; G06F 8/71
See application file for complete search history.

(56) References Cited

U.S. PATENT DOCUMENTS

| | | | |
|---|---|---|---|
| 6,925,443 B1* | 8/2005 | Baggett, Jr. ........... | G06F 21/577 705/1.1 |
| 2004/0003266 A1* | 1/2004 | Moshir .................... | G06F 8/62 713/191 |

(Continued)

OTHER PUBLICATIONS

Notification of Transmittal of the International Search Report and the Written Opinion of the International Searching Authority, or the Declaration dated Jun. 13, 2016 in connection with International Application No. PCT/US2016/015907, 11 pages.

(Continued)

*Primary Examiner* — Saleh Najjar
*Assistant Examiner* — Devin E Almeida

(57) ABSTRACT

This disclosure provides for patch monitoring and analysis, such as in an industrial process control and automation system. A method includes discovering at least one connected device by a risk manager system, including a software module for the connected device and installed patch information for the software module. The method includes identifying current patch information for the software module by the risk manager system. The method includes populating a patch definition file according to the device, the software module, the installed patch information, the current patch information, by the risk manager system. The method includes analyzing the patch definition file. The method includes producing an output based on the analysis by the risk manager system, the output including the software module, the installed patch information, the current patch information, and the status of the software module with respect to the installed patch information.

19 Claims, 3 Drawing Sheets

300

Patch Status
305 — DEVICE A

| 310 SOFTWARE | 315 Patch Version | 320 Current Version | 325 Status |
|---|---|---|---|
| Module A | 1.2 | 1.2 | CURRENT |
| Module B | 3.8.545 | 3.9.1 | OUTDATED |
| Module C | 2.0.1 | 2.0.1 | DEPRECATED |
| Module D | 5.4 | 5.4 | CURRENT |

(56) References Cited

U.S. PATENT DOCUMENTS

| | | | | |
|---|---|---|---|---|
| 2004/0006704 | A1* | 1/2004 | Dahlstrom | G06F 21/577 726/25 |
| 2007/0106978 | A1* | 5/2007 | Felts | G06F 8/65 717/124 |
| 2007/0198678 | A1* | 8/2007 | Dieberger | H04L 12/2602 709/223 |
| 2008/0060071 | A1 | 3/2008 | Hennan et al. | |
| 2008/0163173 | A1* | 7/2008 | Bauer | G06F 9/44536 717/122 |
| 2008/0276295 | A1* | 11/2008 | Nair | G06F 21/57 726/1 |
| 2009/0193407 | A1* | 7/2009 | Lepeska | G06F 8/65 717/170 |
| 2011/0162073 | A1* | 6/2011 | Jeschke | H04L 63/1433 726/25 |
| 2011/0225575 | A1* | 9/2011 | Ningombam | G06F 8/65 717/170 |
| 2011/0270963 | A1* | 11/2011 | Saito | G06F 21/105 709/224 |
| 2011/0302409 | A1 | 12/2011 | Rao et al. | |
| 2013/0055394 | A1 | 2/2013 | Beresnevichiene et al. | |
| 2013/0097710 | A1* | 4/2013 | Basavapatna | H04W 4/02 726/25 |
| 2014/0189873 | A1* | 7/2014 | Elder | H04L 63/1433 726/25 |
| 2014/0245376 | A1* | 8/2014 | Hibbert | H04L 63/1433 726/1 |
| 2014/0344936 | A1* | 11/2014 | Thario | G06F 21/577 726/25 |
| 2015/0172307 | A1* | 6/2015 | Borohovski | H04L 63/1433 726/25 |
| 2015/0227354 | A1* | 8/2015 | Wang | G06F 8/61 717/169 |

OTHER PUBLICATIONS

Gerhards, R.; "The Syslog Protocol"; Network Working Group; Adiscon GmbH; Mar. 2009; 38 pages.

Knapp, E.D.; "Security Intelligence and Analytics in Industrial Systems"; Honeywell Users Group Europe, Middle East and Africa; 2014; 29 pages.

Koelemij, E.D.; "Effective Defense in Depth Strategies for Industrial Control Systems"; Honeywell Users Group Europe, Middle East and Africa; 2014; 21 pages.

Koelemij, S.; "Designing a Secure Industrial Control System"; Honeywell Users Group EMEA; Industrial IT Solutions: 2013; 11 pages.

Koelemij, S.; "Making Cyber Security S.M.A.R.T."; Honeywell Industrial Cyber Security; EMEA HUG Training Session; 2014; 63 pages.

Ricks, B.; "System Center 2012 R2 Operations Manager Documentation"; Microsoft System Center 2012 R2; Microsoft Corp; Nov. 1, 2013; 1389 pages.

Spear, M.; "Industrial Cyber Security 101"; Honeywell Users Group Europe, Middle East and Africa; 2015; 25 pages.

"Certification Testing Specification"; OPC Foundation; Release Candidate 1.02; May 28, 2014; 20 pages.

"Guide for Conducting Risk Assessments—Information Security"; NIST Special Publication 800-30, Revision 1; NIST, U.S. Dept of Commerce; Sep. 2012; 95 pages.

"Honeywell Industrial Cyber Security Overview and Managed Industrial Cyber Security Serevices"; HPS; Jun. 4, 2014; 19 pages.

"Information Technology—Security Techniques—Information Security Risk Management"; Bio Standards Publication; BS ISO/IEC 27005;2011; 80 pages.

"Risk Management and Critical Infrastructure Protection: Assessing, Integrating, and Managing Threats, Vulnerabilities and Consequences"; CRS Rpt for Congress; RL32561; Feb. 4, 2005; 28 pages.

"Security for Industrial Automation and Control Systems Part 2-3: Patch Management in the IACS Environment"; ISA-TR62443-2-3-2015; Jul. 1, 2015; 18 pages.

"Design and Planning Guide for System Center 2012-Operations Manager"; System Center 2012; Microsoft Corporation; Apr. 2012; 13 pages.

* cited by examiner

| SOFTWARE | Patch Version | Current Version | Status |
|---|---|---|---|
| Module A | 1.2 | 1.2 | CURRENT |
| Module B | 3.8.545 | 3.9.1 | OUTDATED |
| Module C | 2.0.1 | 2.0.1 | DEPRECATED |
| Module D | 5.4 | 5.4 | CURRENT |

PATCH MONITORING AND ANALYSIS

CROSS-REFERENCE TO RELATED APPLICATION

This application claims the benefit of the filing date of U.S. Provisional Patent Applications 62/113,165, filed Feb. 6, 2015, which is hereby incorporated by reference.

TECHNICAL FIELD

This disclosure relates generally to network security. More specifically, this disclosure relates to patch monitoring and analysis.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides for patch monitoring and analysis, such as in an industrial process control and automation system. A method includes discovering at least one connected device by a risk manager system, including a software module for the connected device and installed patch information for the software module. The method includes identifying current patch information for the software module by the risk manager system. The method includes populating a patch definition file according to the device, the software module, the installed patch information, the current patch information, by the risk manager system. The method includes analyzing the patch definition file. The method includes producing an output based on the analysis by the risk manager system, the output including the software module, the installed patch information, the current patch information, and the status of the software module with respect to the installed patch information.

Another embodiment includes a risk manager system having a hardware controller and a memory. The hardware controller is configured to discover at least one connected device, including a software module for the connected device and installed patch information for the software module. The hardware controller is configured to identify current patch information for the software module. The hardware controller is configured to populate a patch definition file according to the device, the software module, the installed patch information, the current patch information. The hardware controller is configured to analyze the patch definition file. The hardware controller is configured to produce an output based on the analysis by the risk manager system, the output including the software module, the installed patch information, the current patch information, and the status of the software module with respect to the installed patch information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
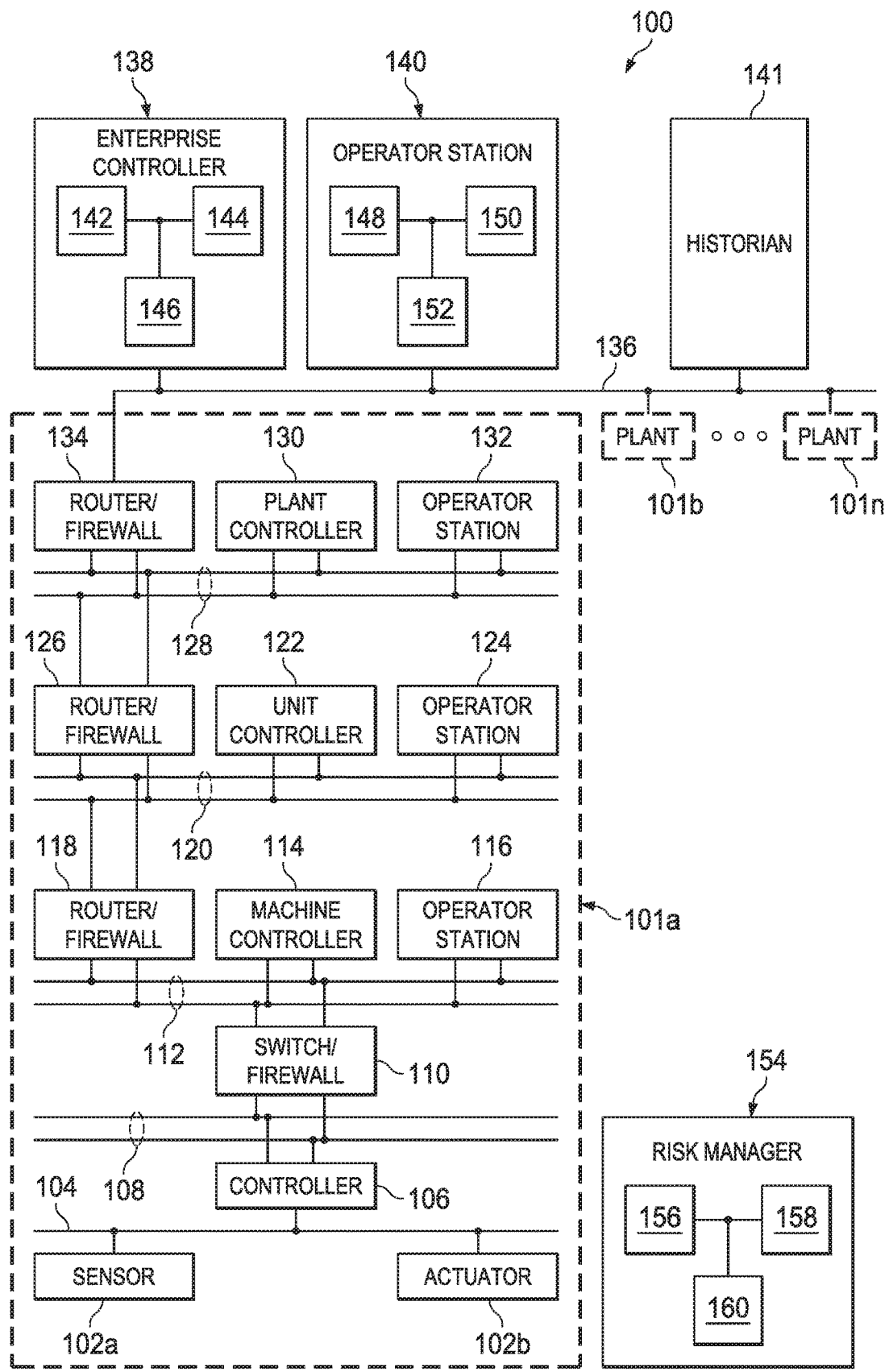
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Ensuring that an industrial site is secure and operational can be extremely important. One element in providing a secure industrial site is to ensure that all software/firmware components that make up a control system are up-to-date with the latest security updates and patches. Unaddressed security vulnerabilities in any of the components in the system 100 could be exploited by attackers to disrupt production or cause unsafe conditions in an industrial plant.

With new security threats continually presented, it is a challenge for plant operations and distributed control system (DCS) vendors to keep up-to-date on the latest threats to understand the level of risk that an industrial site is under. This problem is further complicated for DCS vendors, who often have a variety of new and legacy systems with different versions of operating systems and other core third-party components.

This disclosure recognizes a need for a solution that can evaluate the current patch/update status of software/firmware at an industrial site or other site, identify needed updates, and establish an overall risk level for the system. This approach supports features such as:

the utilization of an industry-standard representation of patches and updates that includes attributes of a patch, as well as plant solutions to which the patch applies; and software that evaluates the current patch status of a system and presents a coherent summary of patches that should be added to or removed from the system, as well as an overall risk level for the site.

This is accomplished (among other ways) by using a risk manager 154. The risk manager 154 includes any suitable structure that supports patch monitoring and analysis. Here, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal processor, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions.

Figures 2, 3:
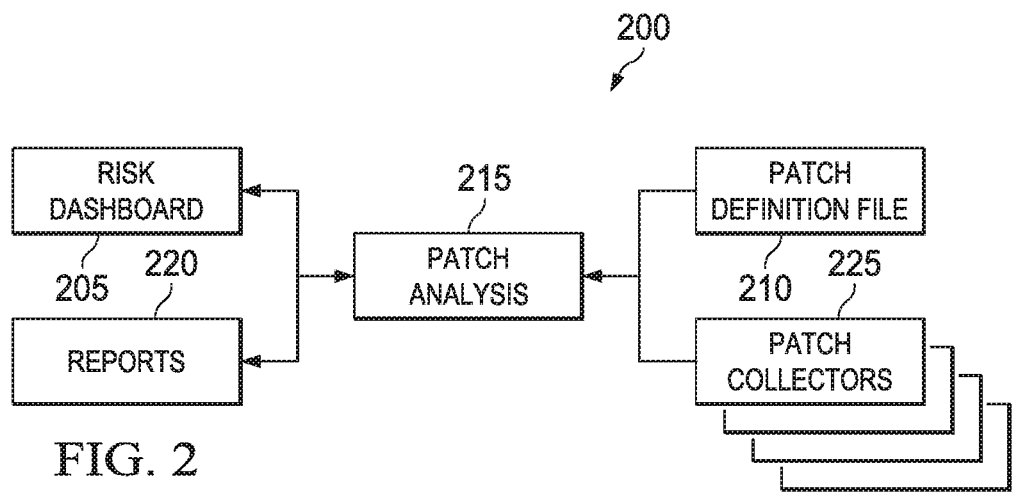
FIG. 2 illustrates an example infrastructure for patch monitoring and analysis according to this disclosure.
FIG. 3 illustrates an example of an output from an infrastructure for patch monitoring as disclosed herein.

FIG. 2 illustrates an example infrastructure 200 for patch monitoring and analysis according to this disclosure. The infrastructure 200 can be supported or implemented using the risk manager 154, for example, or by another controller or hardware system Infrastructure 200 includes a risk dashboard 205 that provides a user interface so that the user can view reports 220 and other information from the patch analysis 215 and can configure the patch analysis 215. Infrastructure 200 also includes a patch definition file 210 as described herein that is readable and writable by the patch analysis 215. Infrastructure 200 also includes patch collectors 225 that can analyze the current patch or version status of software modules of any connected devices, such as any of the devices or components illustrated in FIG. 1, and return patch information to the patch analysis 215, which can use this patch information to populate the patch definition file 210.

Vendors often have their own strategies with respect to patching, and these strategies can be quite different. For example, some vendors deploy incremental patches, while other vendors deploy updates that are comprehensive and replace all previous patches. Patches are also often classified as security- or non-security-related, and patches are often associated with a priority or criticality. In addition, system providers can spend a great deal of time qualifying patches for their systems to ensure that the patches help and do not hurt. In some cases, it is critical that patches are not installed on a particular system.

In accordance with this disclosure, the risk manager 154 supports the use of a patch definition file 210 for patches. The patch definition file 210 can accommodate many or all of the above variations for patches, and the patch definition file 210 can be used in the evaluation of the patch state of a target system. The use of a single patch definition file 210 that includes patches for multiple third-party patches is both unique and comprehensive. Note, however, that other definition files could also be used. The patch definition file 210 can include patch information for multiple software modules from multiple vendors in a single file.

In various embodiments, the patch definition file 210 can include one or more of the features described in Tables 1-3 in an entry for each product and patch on each device that is analyzed. These features, and other features that can be used in various embodiments described herein, are described in more detail in "Security for Industrial Automation and Control Systems-Patch management in the IACS Environment" (ISA-TR62443-2-3 (IEC/TR 62443-2-3), available at time of filing at isa99.isa.org and hereby incorporated by reference).

TABLE 1

| Element | Type | Definition |
| --- | --- | --- |
| VendorName | IdentifierType | A string containing the name of the vendor that is providing the patch information. |
| VendorDescription | TextType | An optional string containing a description of the vendor. |
| PatchVendorName | IdentifierType | A string containing the name of the vendor that is providing the patch information. |
| PatchVendorDescription | TextType | An optional string containing a description of the patch vendor. |

TABLE 1-continued

| Element | Type | Definition |
| --- | --- | --- |
| PatchedProduct | IdentifierType | A string containing the patch product supplier's name of the product that the patch is targeting. EXAMPLE: "SQL Server", "Microsoft Windows", "Adobe Reader", "VMware ESXi", "McAfee Virus Scan Enterprise", "McAfee Scan Engine", "McAfee ePolicy Orchestrator", "McAfee Agent", "Symantec Endpoint Protection" |
| PatchedProductVersion | IdentifierType | A string containing the version of the product that the patch is for. EXAMPLE: "Service Pack 2", "7.15", "A", "R23.9", "11", "5.1", "8.8", "5600", "5.1.1", 4.6, "12.1.4" |
| PatchIdentifier1 | IdentifierType | A string containing the patch product supplier defined primary identification of the patch. |
| PatchIdentifier2 | IdentifierType | An optional string containing a patch product supplier defined secondary identification of the patch. |
| PatchVersion | IdentifierType | An optional string containing the version number of the patch. EXAMPLE: "1", "1.0", "1.2" NOTE: This may be needed if multiple versions of the patch are released due to errors in the previous patch version. |
| ReleaseDate | DateTimeType | A string containing the released date of the patch. EXAMPLE: "2014-01-17" NOTE: Format this string according to ISO 8601. |
| Severity | CodeType | An optional string containing the severity of the patch. The value could be one of the following standard enumerations: Critical - The patch should be installed. It corrects a vulnerability whose exploitation could allow code execution without user interaction. These scenarios include self-propagating malware (e.g. network worms) or unavoidable common use scenarios where code execution occurs without warnings or prompts. Important - The patch should be installed. The patch corrects a vulnerability whose exploitation could result in compromise of (i) the confidentiality, integrity, or availability of data or (ii) the integrity or availability of processing resources, but which require a user action. Optional - The patch may be installed. The patch corrects a vulnerability that requires unique or uncommon user actions. |

TABLE 2

| | | |
|---|---|---|
| UpdateType | CodeType | A string value containing the type of patch. The value could be one of the following standard enumerations: Non_Security - This update is related to a non-security related issue and updates a known issue not related to security. Security - This update is related to a security issue and repairs a known security problem. |
| UpdateDescription | TextType | An optional string value that contains a description of the update and/or patch. |
| PatchStatus | CodeType | A string value containing the patch status. The value could be one of the following standard enumerations: Deprecated - This patch is no longer a update for the system. Current - This patch is up to date and should be installed on all products in the "PassedProduct". |
| ReplacesPatch | TextType | An optional string value that contains a description of the patch being replaced. Example: KB12345 Windows 2008 64 bit |

TABLE 3

| | | |
|---|---|---|
| Disposition | CodeType | A string value containing the patch status. The value could be one of the following standard enumerations: Primary - This patch is a primary patch with dependent patches associated with it. Dependent - This patch is dependent on a primary patch and/or other patches. Standalone - This is a standalone patch with no dependences on any updates. |
| ReferenceInfo | TextType | An optional string value that contains a URL to the update for further details. |
| PassedProduct | IdentifierType | An optional string values containing the <VendorProduct><ProductID> for referencing the vendor specific product. This is an item in the list of products that PASSED testing with this update. |
| FailedProduct | IdentifierType | An optional string value containing the <VendorProduct><ProductID> for referencing the vendor specific product. This is an item in the list of products that FAILED testing with this update |
| HoldProduct | IdentifierType | An optional string value containing the <VendorProduct><ProductID> for referencing the vendor specific product. This is an item in the list of products that are on HOLD for testing with this update |
| NotTestedProduct | IdentifierType | An optional string value containing the <VendorProduct><ProductID> for referencing the vendor specific product. This is an item in the list of products NOT TESTED for this update. |
| UpdateComment | TextType | An optional string that contains a comment on the update. |
| ProductID | IdentifierType | A string identifier used to map the name and version of a product to a test result related to an update. |
| Name | TextType | A string containing the name of the product. |
| OperatingSystem | TextType | A string containing the operating systems description for the product. |
| Version | TextType | A string containing the version of the product. |
| ReleaseDate | DateTimeType | A string containing the released date of the product version. |
| ProductVersion-Comments | TextType | An optional string that contains a comment on the product and version information. |

Also, in accordance with this disclosure, the risk manager 154 implements a tool that can be used to gather installed patch information from target computing nodes using patch collectors 225 and provide a unique analysis using patch analysis 215. The patch information can identify the current status of software/firmware installed or executing on the target computing nodes. The analysis not only identifies missing patches but can also use a unique set of analysis rules to assess risks that the current system's patched state creates. As examples, these rules can use the following information about patches:

Patch criticality or urgency.
Patch type (security or non-security).
Patch status (current or deprecated).
Relationships to other patches ("replaces" or "is replaced by").
Vendor products for which the patch has been qualified.
Vendor products for which the patch has been rejected.

This approach can provide an industry-unique patch analysis that generates a risk level, which shows "at a glance" the security level of an industrial site (or portion thereof) as it relates to patches. In addition, this analysis provides detailed information about specifically what is needed to bring the system into compliance.

In some embodiments, the results of the analysis can be presented both through an on-product dashboard component illustrated as risk dashboard 205 and through reports 220 that are periodically provided to users. FIG. 2 shows a high-level architecture for one example implementation of this approach. The on-product risk dashboard 205 could identify an overall risk value and provide the ability to "drill down" in order to obtain details about what is needed to reduce the risk level. The reports can have the same information in textual format, or can have more, less, or different information.

FIG. 3 illustrates an example of an output 300 from an infrastructure 200 for patch monitoring as disclosed herein, that can be implemented by risk manager 154, and can be produced by patch analysis 215, for example in the risk dashboard 205 or as a report 220.

This example of an output 300 is for a device A 305, which can be any of the devices or components in FIG. 1 or otherwise. In this example, the patch collectors 225 have identified software 310 installed on device A 305, shown here as modules A-D. The patch definition file 210 has been populated with patch information collected by patch collectors 225, which is used by patch analysis 215 to produce the output 300. Each module has a large amount of associated data as represented in the patch definition file 210 and described in the tables above.

In this example, the output 300 shows, for each software 310 on device A 305, a patch version 315 (the version installed on device A 305), the current patch version 320 (the most-recent patch available), and the status 325 of the software with respect to the patch versions.

In this example, Module A has patch version 1.2, which is the current patch version, so its status is listed as current. Module B has patch version 3.8.545, but the current patch version is 3.9.1, so its status is listed as "outdated." Module C has patch version 2.0.1, which is the current patch version, but the patch collector has noted that this version is considered "deprecated," so that is listed in the status. Finally, Module D has patch version 5.4, which is the current patch version, so its status is listed as current.

Of course, FIG. 3 presents only one simple example of an output 300 of the infrastructure 200 for patch monitoring, and those of skill in the art will recognize that other or additional output data could be presented.

Figure 4:
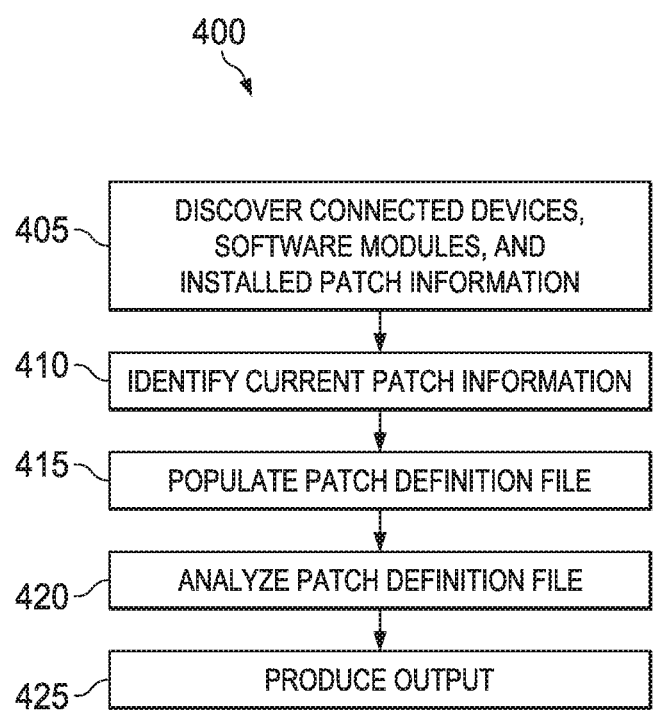
FIG. 4 illustrates a flowchart of a process in accordance with disclosed embodiments.

FIG. 4 illustrates a flowchart of a process 400 that can be performed, for example, by a risk manager 154 or other device, referred to generically as the "system" below. In particular, the process can be performed by a risk manager system including at least a controller, a memory, and a display.

The system discovers at least one connected device, including a software module for the connected device and installed patch information for the software module (405). The connected devices can be, for example, any of the devices or components illustrated in FIG. 1, or otherwise. Each device may have multiple software modules, and "module" is intended to refer generically to any software product, application, or other element that can be patched to be updated, including but not limited to security or antivirus software, application software, operating system software, and other software. This can be performed, for example, by one or more patch collectors 225 as described herein. This step can include obtaining information associated with multiple devices in a computing system, the information identifying a current status of software/firmware installed on the devices.

The system identifies current patch information for the software module (410). This can be performed, for example, by one or more patch collectors 225 as described herein, and can be performed by, for example, checking current patch information over the Internet or from entries already in a patch definition file 210.

The system populates a patch definition file 210 according to the device, the software module, the installed patch information, the current patch information, or other information (415). This process can be performed by the patch analysis 215. Of course, in many cases there will already be much data already populating the patch definition file, and this process serves to update the patch definition file.

The system analyzes the patch definition file 210 (420). This can include analyzing data regarding the devices, the software modules on each device, the installed patch information for each software module, the current patch information for each software module, or other information. In particular, this analysis can include identifying current, outdated, and deprecated installed patch information for each software module. This step can include analyzing the stored information using a patch definition file, the patch definition file containing patch information associated with multiple patches to the software/firmware.

In some embodiments, this analysis can apply analysis rules to assess security risks that the device's patched state creates, as associated with the device or software module. As examples, these rules can use information about patches including patch criticality or urgency, patch type (security or non-security), patch status (current or deprecated), relationships to other patches ("replaces" or "is replaced by"), vendor products for which the patch has been qualified, or vendor products for which the patch has been rejected.

The system produces an output 300 based on the analysis (425). The output can identify (i) a state of each device and (ii) a security risk associated with each device based on the analysis. The output can show, for each software module on the device, the installed patch information, the current patch information, and the status of the software module with respect to the installed patch information. The output can include a summary of patches that should be added to or removed from the system, as well as an overall risk level.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

Although FIG. 2 illustrates one example of an infrastructure 200 for patch monitoring and analysis, various changes may be made to FIG. 2. For example, the functional division of the components and sub-component in FIG. 2 are for illustration only. Various components or sub-components could be combined, further subdivided, rearranged, or omitted and additional components or sub-components could be added according to particular needs.

Note that the risk manager 154 and/or the infrastructure 200 for patch monitoring and analysis shown here could use or operate in conjunction with various features described in the following previously-filed and concurrently-filed patent applications (all of which are hereby incorporated by reference):

U.S. patent application Ser. No. 14/482,888 entitled "DYNAMIC QUANTIFICATION OF CYBER-SECURITY RISKS IN A CONTROL SYSTEM";

U.S. Provisional Patent Application No. 62/036,920 entitled "ANALYZING CYBER-SECURITY RISKS IN AN INDUSTRIAL CONTROL ENVIRONMENT";

U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES"

and corresponding non-provisional U.S. patent application Ser. No. 14/871,695 of like title filed concurrently herewith;

U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521 of like title filed concurrently herewith;

U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855 of like title filed concurrently herewith;

U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732 of like title filed concurrently herewith;

U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503 of like title filed concurrently herewith;

U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 14/871,605 of like title filed concurrently herewith;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814 of like title filed concurrently herewith;

U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136 of like title filed concurrently herewith; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547 of like title filed concurrently herewith.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for patch monitoring in an industrial process control and automation system comprising:
  discovering a connected device by a risk manager system, including a software module for the connected device and installed patch information for the software module;
  identifying current patch information for the software module by the risk manager system;
  populating a patch definition file according to the connected device, the software module, the installed patch information, and the current patch information, by the risk manager system;
  analyzing the patch definition file to assess security risks associated with the connected device or the software module, the security risk based on the installed patch information and the current patch information, wherein the analysis includes patch criticality, patch urgency, patch type, and relationships to other patches; and
  producing an output based on the analysis by the risk manager system, the output identifying the security risks, the software module, the installed patch information, the current patch information, and a status of the software module with respect to the installed patch information.

2. The method of claim 1, wherein the analysis rules further includes at least one of vendor products for which a patch has been qualified, or vendor products for which the patch has been rejected.

3. The method of claim 1, wherein the connected device has multiple software modules, each having corresponding installed patch information and current patch information.

4. The method of claim 1, wherein discovering the connected device by the risk manager system includes obtaining information associated with multiple connected devices in a computing system, the information identifying a current status of software/firmware installed on the connected devices.

5. The method of claim 1, wherein populating the patch definition file includes updating information already in the patch definition file.

6. The method of claim 1, wherein the output includes an identification of the connected device, an identification of the software module, a version number corresponding to the installed patch information, and a version number corresponding to the current patch information.

7. The method of claim 1, wherein the output is a risk dashboard user interface displayed to a user.

8. The method of claim 1, wherein the patch definition file stores patch information for multiple software modules from multiple vendors in a single file.

9. The method of claim 1, wherein the output includes a summary of patches that should be added to or removed from the connected device.

10. A risk manager system for patch monitoring in an industrial process control and automation system comprising:
a hardware controller; and
a memory, the hardware controller configured to:
discover a connected device, including a software module for the connected device and installed patch information for the software module;
identify current patch information for the software module;
populate a patch definition file according to the connected device, the software module, the installed patch information, and the current patch information;
analyze the patch definition file assess security risks associated with the connected device or the software module, the security risk based on the installed patch information and the current patch information, wherein the analysis includes patch criticality, patch urgency, patch type, and relationships to other patches; and
produce an output based on the analysis by the risk manager system, the output identifying the security risks, the software module, the installed patch information, the current patch information, and a status of the software module with respect to the installed patch information.

11. The risk manager system of claim 10, wherein the analysis rules further includes at least one of vendor products for which a patch has been qualified, or vendor products for which the patch has been rejected.

12. The risk manager system of claim 10, wherein the connected device has multiple software modules, each having corresponding installed patch information and current patch information.

13. The risk manager system of claim 10, wherein, to discover the connected device, the hardware controller is configured to obtain information associated with multiple connected devices in a computing system, the information identifying a current status of software/firmware installed on the connected devices.

14. The risk manager system of claim 10, wherein, to populate the patch definition file, the hardware controller is configured to update information already in the patch definition file.

15. The risk manager system of claim 10, wherein the output includes an identification of the connected device, an identification of the software module, a version number corresponding to the installed patch information, and a version number corresponding to the current patch information.

16. The risk manager system of claim 10, wherein the output is a risk dashboard user interface displayed to a user.

17. The risk manager system of claim 10, wherein the patch definition file stores patch information for multiple software modules from multiple vendors in a single file.

18. The risk manager system of claim 10, wherein the output includes a summary of patches that should be added to or removed from the connected device.

19. A non-transitory computer readable medium containing instructions that, when executed by at least one processor of a risk manager system for patch monitoring in an industrial process control and automation system, causes the at least one processor to:
discover a connected device, including a software module for the connected device and installed patch information for the software module;
identify current patch information for the software module;
populate a patch definition file according to the connected device, the software module, the installed patch information, and the current patch information;
analyze the patch definition file assess security risks associated with the connected device or the software module, the security risk based on the installed patch information and the current patch information, wherein the analysis includes patch criticality, patch urgency, patch type, and relationships to other patches; and
produce an output based on the analysis, the output identifying the security risks, the software module, the installed patch information, the current patch information, and a status of the software module with respect to the installed patch information.

* * * * *